Sept. 27, 1955  B. F. ARPS  2,719,062
DETACHABLE HALF TRACK ATTACHMENT
Filed April 15, 1953  5 Sheets-Sheet 1

INVENTOR.
BRUNO F. ARPS
BY
A. S. Kroh
ATTORNEY

Sept. 27, 1955 B. F. ARPS 2,719,062
DETACHABLE HALF TRACK ATTACHMENT
Filed April 15, 1953 5 Sheets-Sheet 2

INVENTOR.
BRUNO F. ARPS
BY
ATTORNEY

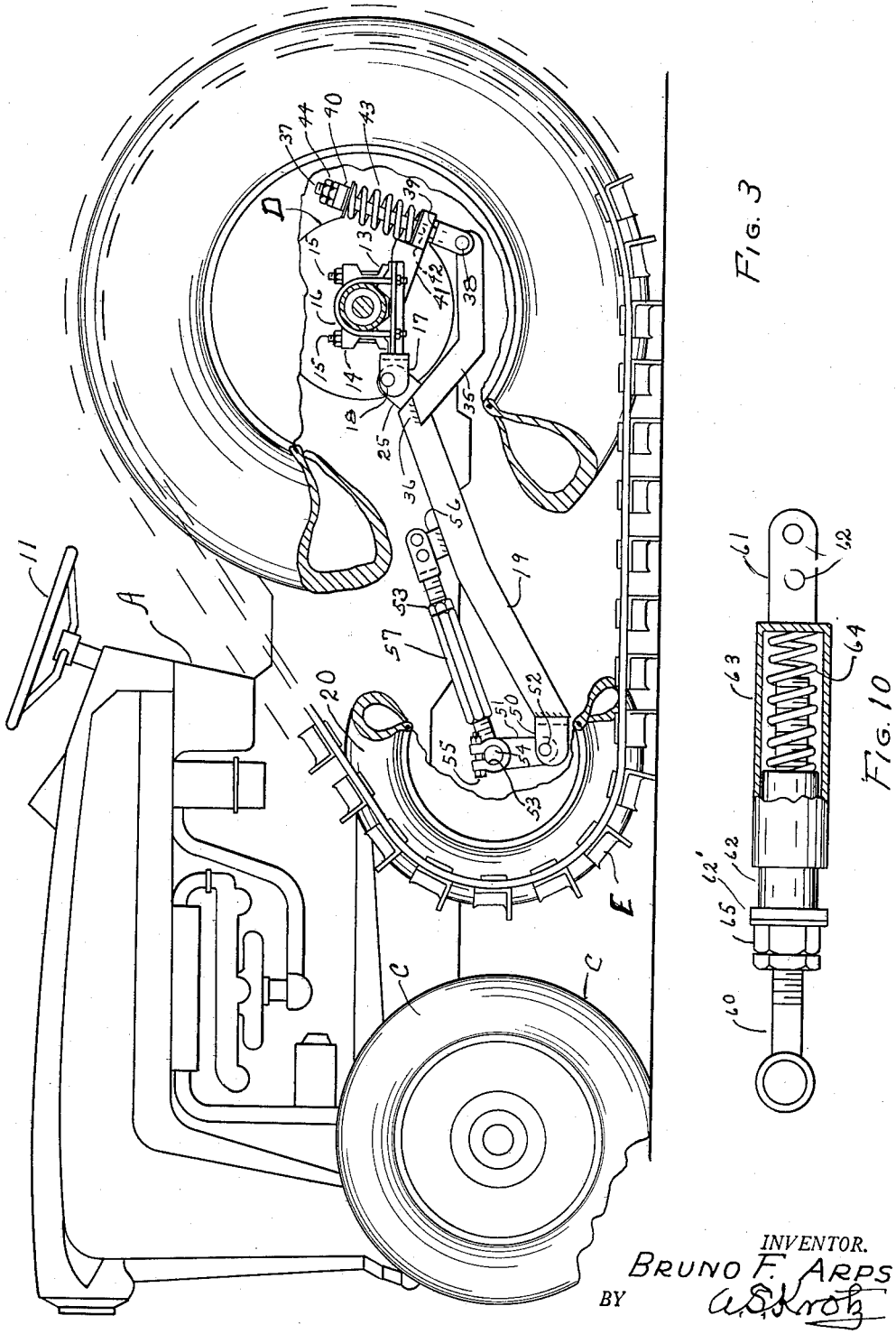

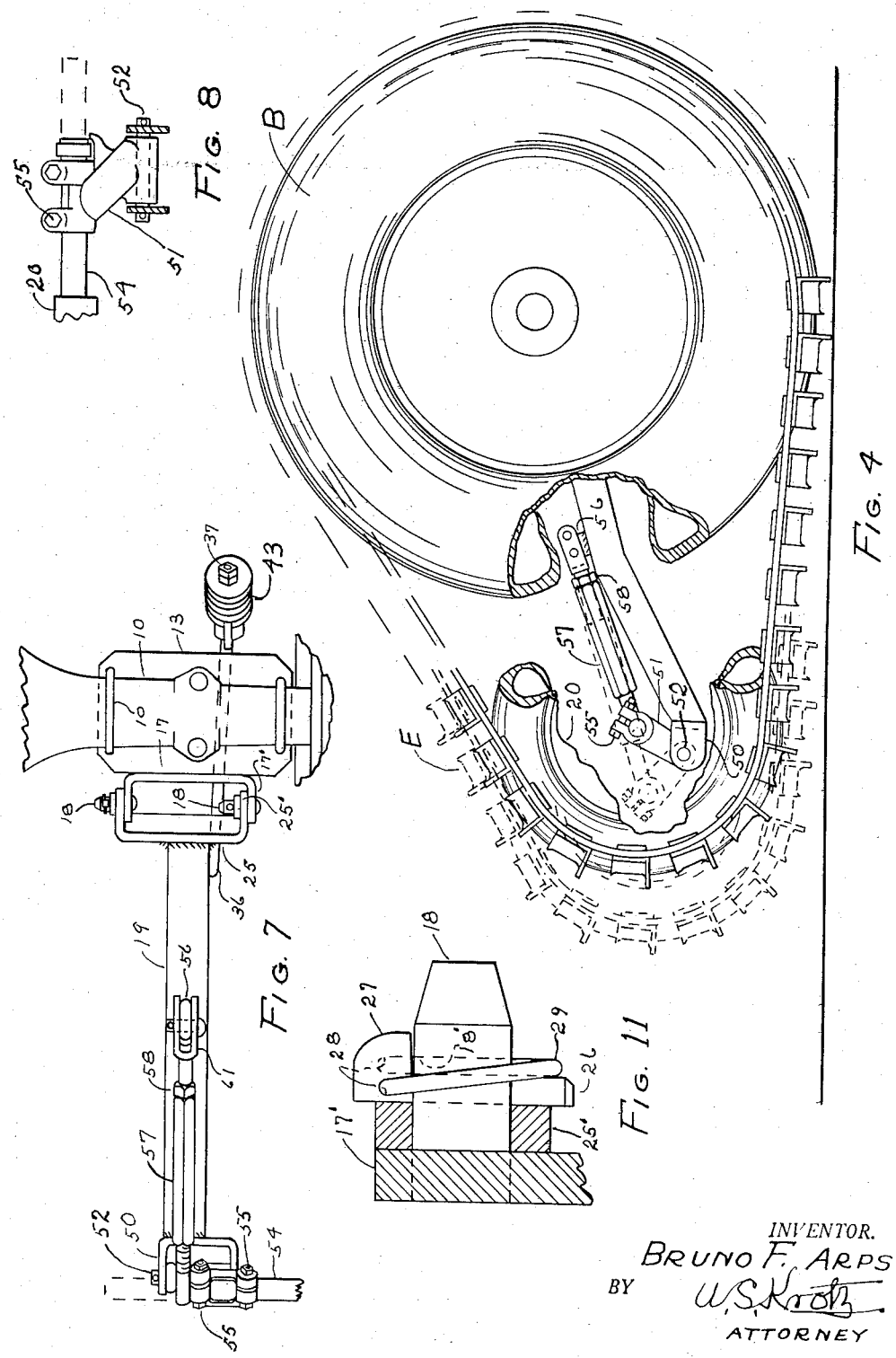

Sept. 27, 1955     B. F. ARPS     2,719,062
DETACHABLE HALF TRACK ATTACHMENT

Filed April 15, 1953     5 Sheets-Sheet 5

INVENTOR.
BRUNO F. ARPS
BY
ATTORNEY

United States Patent Office 2,719,062
Patented Sept. 27, 1955

2,719,062
DETACHABLE HALF TRACK ATTACHMENT

Bruno F. Arps, New Holstein, Wis., assignor to Arps Corporation, New Holstein, Wis.

Application April 15, 1953, Serial No. 348,997

3 Claims. (Cl. 305—8)

The present invention relates to an endless chain track adapted to be carried by the rear driving wheels of a standard tractor and auxiliary wheels spaced preferably a short distance in front of the rear driving wheels of the tractor, the auxiliary wheels being preferably spring held downwardly.

The principal objects of the present invention are to provide simple means for adjusting the auxiliary wheels transversely, vertically and longitudinally and for adjusting the tautness of the chain belt track (hereinafter called track).

Other objects of this invention are to provide means for removing the supplemental wheel assembly by simply pulling a lynch pin and sliding the assembly off their hinge pins, the simple means provided for adding a downward yielding pressure on the supplemental wheels and a convenient inexpensive means for adjusting the supplemental wheels transversely or forwardly and rearwardly.

A further object of the present invention is to provide a design that can be manufactured at low cost and one that can be quickly and easily attached and detached.

To these and other useful ends, my invention consists of parts, combinations of parts or their equivalents and mode of connecting the parts to a tractor and adjusting the same as described and claimed and shown in the accompanying drawings in which:

Fig. 3 is a view similar to Figure 1 except that the auxiliary wheel is adjusted to a lower position than shown in Figure 1.

Fig. 4 is a view without the tractor, showing the driving and auxiliary wheels cut away with the auxiliary wheel adjusted rearwardly for loosening the track, the forward position of the track being shown by dotted lines.

Figs. 6–11 are drawings illustrating details.

Figure 1:
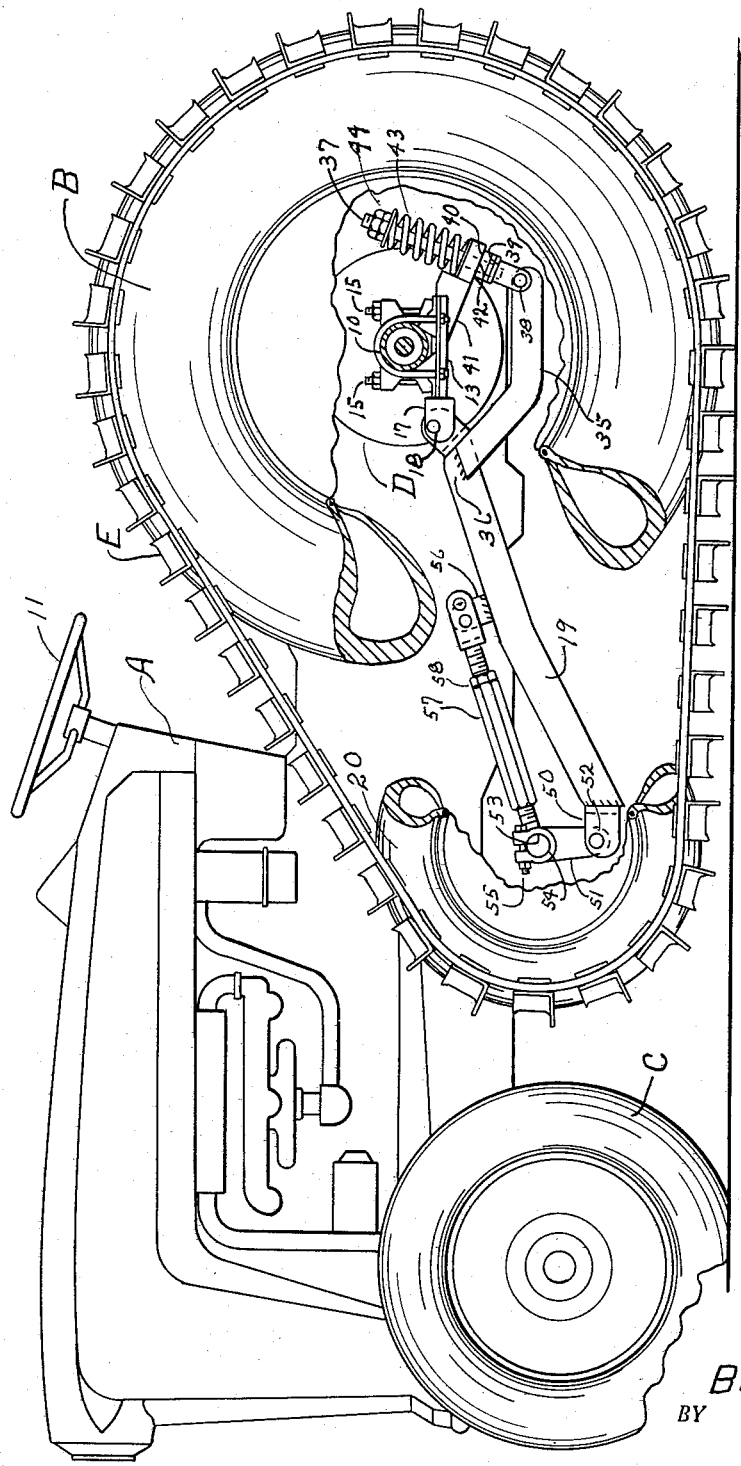
Fig. 1 is a side elevational view, showing a fraction of a conventional tractor with my invention attached thereto, the auxiliary wheel being shown in its preferred vertical adjusted position.

As thus illustrated the tractor is designated in its entirety by reference character A. Reference character B designates in their entireties the rear driving wheels of the tractor and C designates in their entireties the front guiding wheels of the tractor. Reference character D designates the differential housing of the tractor having axle housings 10—10 the axle of which carry wheels B.

The front axle of the tractor and its connected parts being standard, do not require description. Wheels C are guided by steering wheel 11 with a seat 12 for the operator positioned in its rear.

The adjusting means for the tautness of the track is within reach of the operator while in the seat for a purpose which will hereinafter appear.

I provide two brackets 13—13 which are secured to housings 10 either by means of caps 14—14 and bolts 15—15 or by means of U-bolts 16—16 or both.

Brackets 13 on their front edges are provided with U-shaped brackets 17—17, their flanges 17' being provided with pins 18—18 which extend in the same direction (see Figures 7 and 11).

I provide arms 19—19 for carrying supplemental wheels 20—20. Arms 19 are secured at their rear ends to U-shaped brackets 25—25, their flanges 25' being provided with openings for the free reception of pins 18.

Members 25 are held into position on pins 18 as follows see Figure 11: openings 18' are provided in pins 18 a suitable distance from member 17' and a pin 26 is provided in openings 18' for holding member 25' into position, the pin having a head 27 with spaced openings 28—28 in the head. I provide rings 29 with inwardly extending ends adapted to be turnably extended into openings 28. Rings 29 have spring characteristics so they normally stay in the position as shown; thus by swinging rings 29 outwardly pin 26 may be removed for removing members 19 from the tractor.

Figure 2:
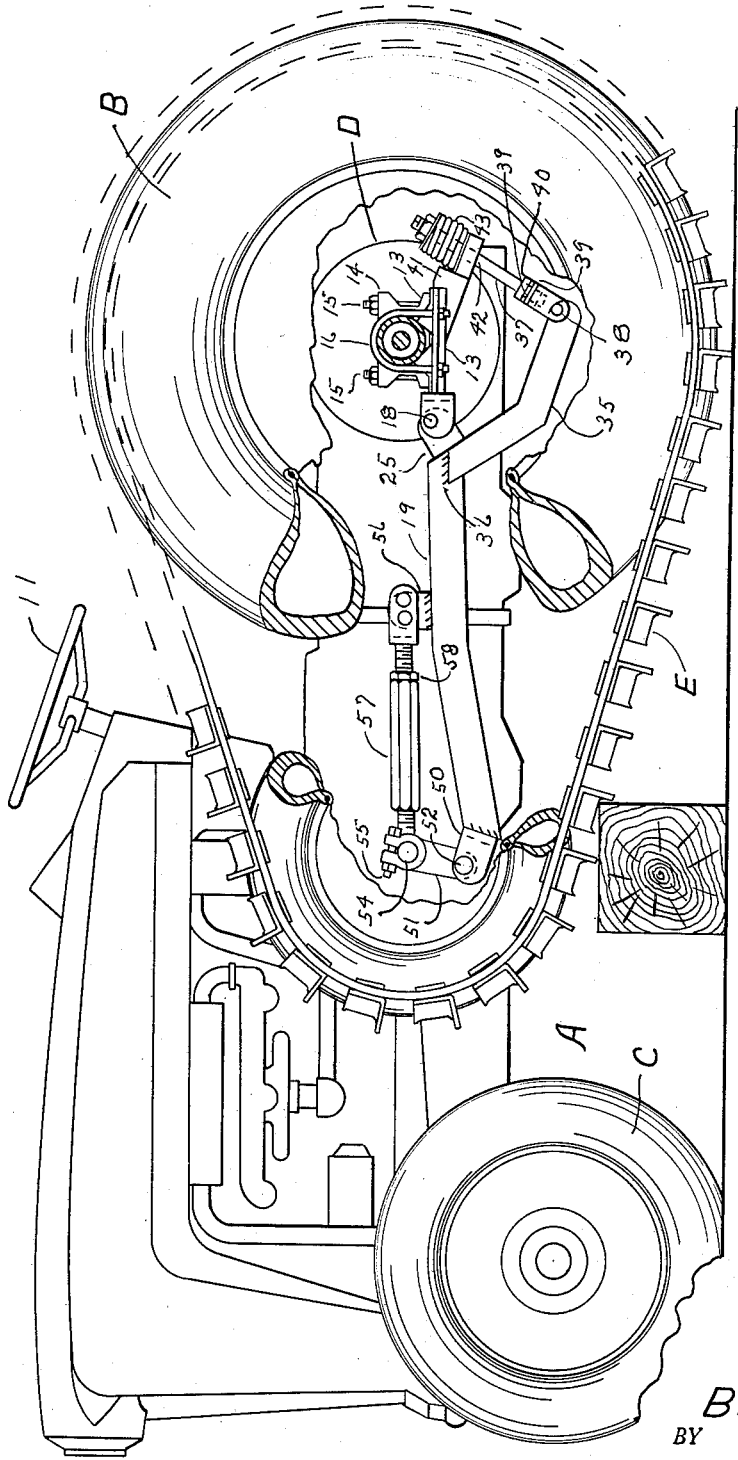
Fig. 2 is a view similar to Figure 1 except illustrating the auxiliary wheel and track traveling over an obstruction.

By referring to Figure 2 it will be seen that applicant provides rearwardly extending arms 35—35 secured to members 19 as at 36 the rear ends being hinged to forked bolts 37—37 as at 38—38. These bolts have shoulders as at 39 on which washers 40 rest.

Brackets 41—41 are secured to brackets 13 through which bolts 37 freely extend as at 42, with washers 40 for determining the minimum height of wheels 20 from the ground surface as illustrated in Figure 1.

Thus if it is desired to hold the front end of track E slightly higher than the chord between the bottom surface of wheels B and C or slightly above the ground in order to provide easy steering of the tractor, washers 40 may be the proper thickness for this purpose. There are conditions when steering would be quite difficult if the track was held in the position shown in Figure 3.

It will be seen that arms 19 at their front ends are free to move vertically from the position determined by collars 40, on pins 18 as axes; and that springs 43 rest on brackets 41 so the downward pressure on the front ends of members 19 may be adjusted by means of nuts 44.

I will now describe track E and the mounting wheels 20 on the front end of arms 19. Track E may be similar to that shown in my co-pending application Serial No. 213,075 filed February 28, 1951.

I secure a U shaped bracket 50—50 to the front ends of members 19 and hingedly mount the lower end of a bracket 51 to member 50 (see Figure 8) by means of a pin 52, the upper end of bracket 51 having an opening 53 for the reception of a spindle 54, the opening being split having bolts 55 whereby spindle 54 may be tightly clamped in openings 53.

Supplemental wheels 20 are suitably rotatably mounted on spindles 54 so the transverse adjustment of wheels 20 may be made by loosening bolts 55 and sliding spindles 54 for determining the position of the wheels which necessarily must align with the tractor driving wheels B. In case of an extremely wide adjustment of wheels B, spindles 54 may be turned end for end in bracket 51.

Figure 6:
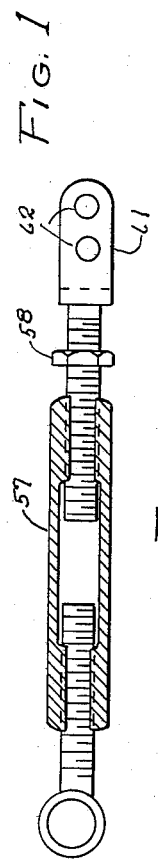

I secure a bracket 56 to member 19 as illustrated in the various figures and connect the upper end of this bracket to the upper end of bracket 51 or to spindle 54 by means of a standard type turnbuckle 57 (see Figures 6 and 7) which may be locked into position by means of a nut 58, thus as shown in Figures 3 and 4. Brackets 51 at their upper ends may be moved forwardly or rearwardly on pin 52 as an axis for adjusting the tautness of track E or for loosing the track sufficiently for removing it from the wheels.

Thus it will be seen that in case of necessity because of soil conditions or otherwise the driver can without leaving the seat reach down and adjust the turnbuckle thus avoiding stepping out into the mud to make such an adjustment. This usually occurs when meeting a muddy soil condition.

Figure 9:
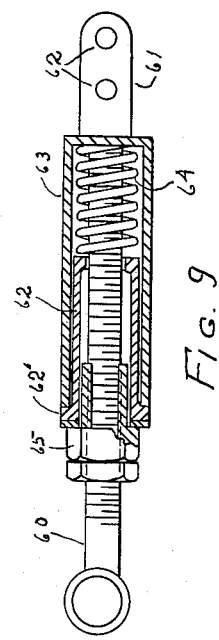
Figure 5:
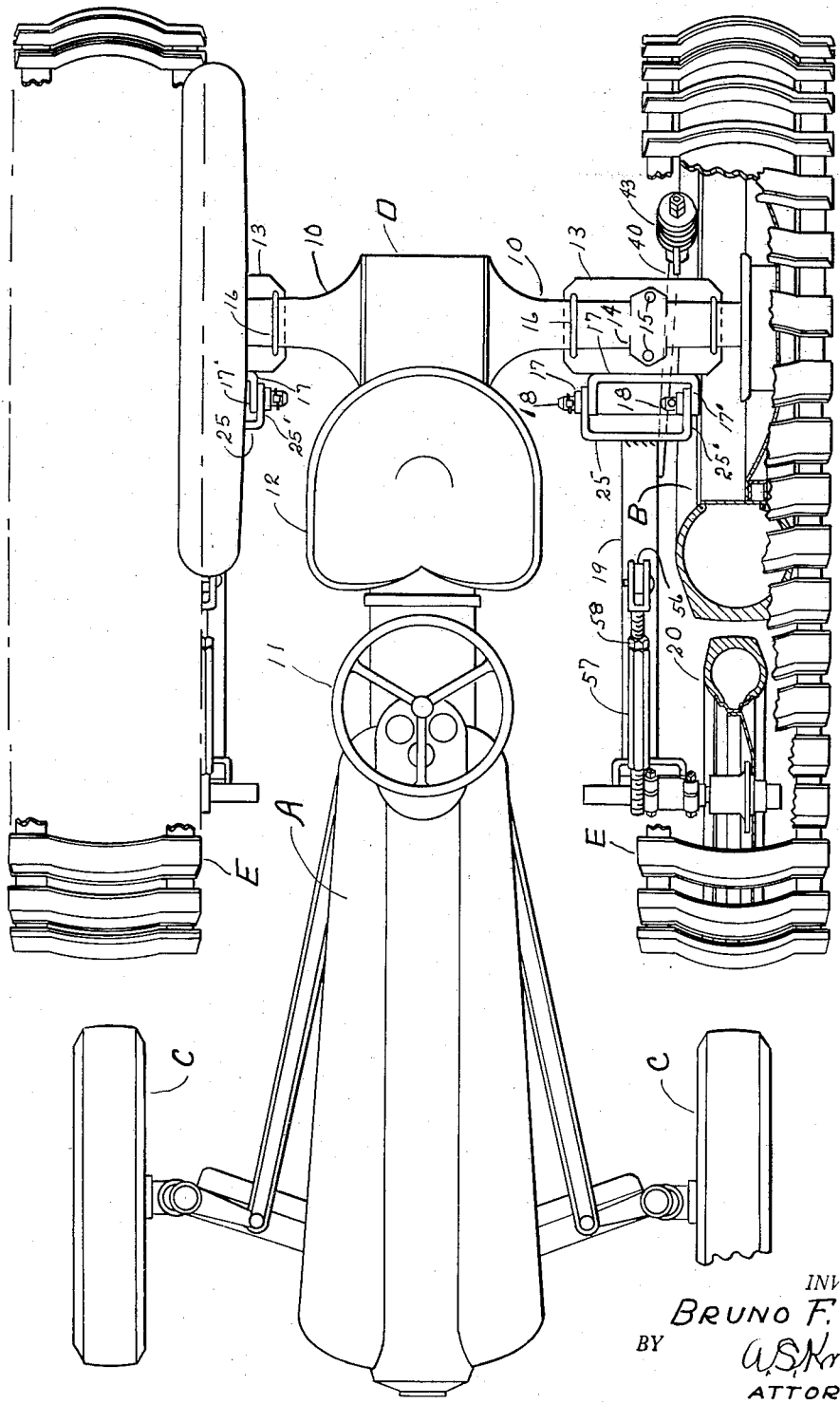
Fig. 5 is a top view of a well known tractor having my attachment attached thereto, a fraction of the left hand wheels and left hand track cut away.

In Figures 9 and 10 I provide another form of adjustment between members 54 and 56. In this design the tautness of the track is yieldingly held against spring pressure, at any adjusted position of spindle 54 as follows: the front end 60 of this device may be secured to spindle 54 similar to the front end of turnbuckle 57, the rear end 61 being forked and adapted to be secured to bracket 56 similar to the rear end of member 57. Member 61 has two spaced openings 62—62 providing means for extreme adjustments of this member which is secured preferably to a cylinder 63.

Thus it will be seen that the device shown in Figures 9 and 10 may be used in the place of turnbuckle 57 with the exception that turnbuckle 57 is fixed in its adjustments; however the device shown in Figures 9 and 10 may be adjusted as to its maximum length as follows:

Sleeve 62 is slidably mounted in the open end of member 63, its rear end resting against springs 64. Bars 60 are screw threaded into member 62 and locked into position by means of nuts 65. The front ends of bars 60 are adapted to engage spindle 54 similar to the front end of turnbuckle 57.

It will be seen that the device shown in Figures 9 and 10 may be changed as to length for the purpose of yieldingly holding the track taut; however provision is made for limiting the rearward movement of member 60 by a flange 62' as illustrated in Figure 9, wherein member 60 is shown as being in its extreme rearward adjusted position.

Applicant does not wish to be understood as limiting his invention to the specific details shown. Clearly many minor detail changes can be made in the designs shown without departing from the spirit and scope of his invention.

Having thus shown and described my invention I claim:

1. In a half track attachment for tractors having a pair of driving wheels each carrying an endless track and a pair of guiding wheels spaced a distance from the driving wheels, the driving wheels being mounted on an axle and there being housings for said axle, comprising main arms transversely hinged at one set of ends to the axle housings, supplemental wheels rotatably mounted on the free ends of said main arms and each in engagement with an endless track, means for adjusting said supplemental wheels fore and aft relative to said main arms, other means for adjusting said supplemental wheels transversely of said arms, the main arms being provided with means for limiting downward movement of the free ends of the same including a first pair of rearwardly extending arms secured to said main arms adjacent the rear ends thereof, a second pair of rearwardly extending arms secured to said axle housings and having openings therein, upwardly projecting bolts secured to the rear ends of the first rearwardly extending arms and extending through the openings in the second rearwardly extending arms, each bolt being provided with an adjustable stop contactable with the second rearwardly extending arms to limit downward movement of the front end portions of the main arms, springs mounted on said bolts and engaging the second rearwardly extending arms, and adjustable means on the bolts for regulating the expansive force of said springs relative to the second rearwardly projecting arms.

2. In a half track attachment for tractors having a pair of driving wheels each carrying an endless track and a pair of guiding wheels spaced a distance from the driving wheels, the driving wheels being mounted on an axle and there being housings for said axle, comprising main arms transversely hinged at one set of ends to the axle housings, supplemental wheels rotatably and adjustably mounted relative to the free ends of said main arms and each in engagement with an endless track, the means for adjustably mounting the supplemental wheels relative to the main arms including upwardly extending brackets transversely hinged at their lower end portions to the free ends of the main arms, said supplemental wheels being rotatably mounted on the upper end portions of said brackets, upwardly extending anchors secured to said main arms in spaced relation to said brackets, adjustable yielding means forming connections between the anchors and brackets, each adjustable yielding means including a cylinder, a sleeve slidably mounted in the open end portion of said cylinder, a spring within the cylinder yieldingly contacting the inner end of the sleeve, one end portion of each adjustable yielding connection being threadably engaged with its sleeve, a collar on the outer end of each sleeve forming a stop to limit inward movement of the sleeve whereby the operating length of an adjustable yielding connection against the pressure of its spring and the rearward movement of a collar against the pressure of its spring may be determined.

3. In a half track attachment for tractors having a pair of driving wheels each carrying an endless track and a pair of guiding wheels spaced a distance from the driving wheels, the driving wheels being mounted on an axle and there being housings for said axle, comprising main arms transversely hinged at one set of ends to the axle housings, supplemental wheels rotatably and adjustably mounted relative to the free ends of said main arms and each in engagement with an endless track, the means for hingedly mounting the main arms to the axle housings including transversely spaced projections on the housings, each projection having a pin in axial alinement therewith, one of said pins having a lynch pin, the rear ends of said main arms carrying brackets formed with spaced apertured projections adapted to slide over said pins and to be locked in position by said lynch pins.

References Cited in the file of this patent

UNITED STATES PATENTS

| | | |
|---|---|---|
| 1,256,744 | Tolsma | Feb. 19, 1918 |
| 1,352,260 | Gunther | Sept. 7, 1920 |
| 1,397,139 | Muscott | Nov. 15, 1921 |
| 2,587,813 | Bombardier | Mar. 4, 1952 |
| 2,613,116 | Tutton | Oct. 7, 1952 |
| 2,654,639 | Bombardier | Oct. 6, 1953 |

FOREIGN PATENTS

| | | |
|---|---|---|
| 409,226 | Germany | May 12, 1923 |